May 5, 1964　　　W. A. JACOBS ETAL　　　3,131,425
EMBOSSING, SHEETING AND WINDING MACHINE AND PROCESS
Filed July 28, 1961　　　　　　　　　　　　　　2 Sheets-Sheet 1

INVENTORS
**WILLIAM A. JACOBS
KENNETH A. HORNUNG**

BY *Fisher, Christen and Goodson*

ATTORNEYS

May 5, 1964 W. A. JACOBS ETAL 3,131,425
EMBOSSING, SHEETING AND WINDING MACHINE AND PROCESS
Filed July 28, 1961 2 Sheets-Sheet 2

INVENTORS
**WILLIAM A. JACOBS
KENNETH A. HORNUNG**

BY Fisher, Christen and Goodson

ATTORNEYS

United States Patent Office 3,131,425
Patented May 5, 1964

3,131,425
EMBOSSING, SHEETING AND WINDING
MACHINE AND PROCESS
William A. Jacobs, Ellenville, and Kenneth A. Hornung, Kerhonkson, N.Y., assignors to Sun Chemical Corporation, New York, N.Y., a corporation of Delaware
Filed July 28, 1961, Ser. No. 127,575
10 Claims. (Cl. 18—4)

This invention relates to an embossing, sheeting and winding machine and process for converting sheet material into an embossed, continuous length sheet material or a multitude of embossed sheets. More particularly, this invention is directed to a machine and processes for embossing sheeting and winding thermoplastic sheet material to form embossed continuous length sheet material or a multitude of embossed sheets.

It is a principal object of this invention to provide a machine and processes for converting continuous length sheet material into embossed continuous length sheet material at high rates of production.

It is another object to provide a machine and process for quickly transforming a roll or other package of continuous length sheet material into a multitude of embossed sheets of predetermined length.

It is a further object to provide a machine and process which can be employed alternatively to provide embossed continuous length sheet material of a multitude of embossed sheets of predetermined length as desired.

A further object is the provision of a process and apparatus for manufacturing embossed sheet material substantially free of objectionable distortions, bows, thinning, bunching and the like.

A further object is the provision of a process and apparatus for embossing sheet material by substantially automatic means.

A still further object is the provision of a process and apparatus for embossing continuous length, foamed, thermoplastic sheet material with a minimum of heat induced contraction of said sheet material.

Further objects and advantages of this invention will become apparent from the following detailed description taken in conjunction with the appended drawings in which.

Figure 1:
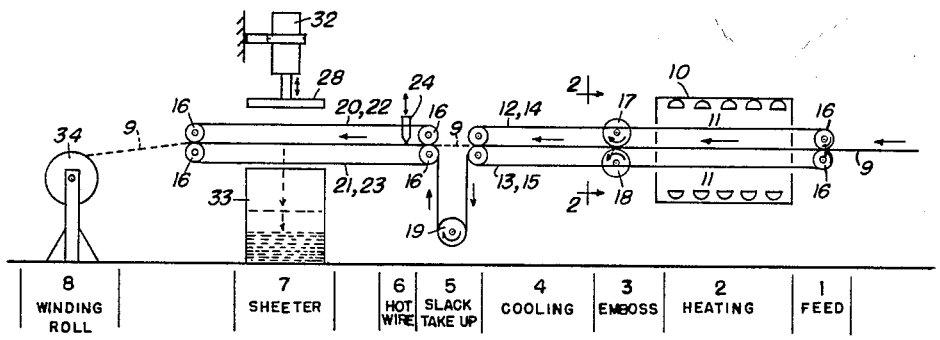
FIG. 1 is a side elevation in partial cutaway of the novel machine.

Referring to FIG. 1 there is shown diagrammatically the over-all machine of this invention including feed supply zone 1, heating zone 2, embossing zone 3, cooling zone 4, slack take-up zone 5, cutter zone 6, sheeting zone 7 and winding zone 8 and sheet material 9. The feed supply zone can comprise a suitable feed supply roll or other source of continuous foamed sheet, thermoplastic material such as expanded polystyrene sheet material.

The heating zone 2 comprises a four-walled tunnel 10 having inwardly directed heating lamps 11, e.g. of the infra-red type, mounted on the ceiling and floor of said tunnel. A temperature gradient is preferably provided in the heating zone such that the entrance portions are maintained at lower or more moderate temperatures than the intermediate portions which, in turn, are maintained at lower or more moderate temperatures than the exit portions adjacent the embossing zone 3. Temperature regulation is conveniently accomplished by regulating the supply of electrical power to, or by adjusting the size or number of lamps operating in, respectively, the entrance portions, the intermediate portions and the exit portions of the tunnel 10. In any event, the temperature at any point in the heating zone 2 should never be permitted to reach or exceed the melting point of the sheet material 9; otherwise, undue sagging, distorting and even breaking of sheet material takes place. It is sufficient that the exit temperature of the sheet material 9 be high enough to render sheet material pliable and formable, e.g. within the softening point range of sheet material. The sheet material 9 is moved through the heating zone 2 to the embossing zone 3 and the cooling zone 4 by a conveying means comprising a pair of vertically-disposed, sprocket driven continuous chains 12—13 and 14—15 along each edge of the sheet material 9. Each chain pair has an upper chain 12 (14) and a lower chain 13 (15). The upper and lower chains 12 (14) and 13 (15) respectively of each pair are substantially coplanar and the lower length of the upper chain 12 (14) normally tightly engages the upper length of the lower chain 13 (15) such that the sheet material 9 disposed between them is tightly gripped. The outer surface of each link of the chains 12, 13, 14 and 15 can be provided with friction treads such as rubber so as to better grip the sheet material 9. Each chain 12 through 15 is mounted by sprocket wheels 16 at each end thereof. The sprocket wheels 16 are driven by any suitable means such as by an electric motor operating at constant speed. The upper and lower chains of each pair are respectively synchronized by any suitable means, for example by gears or sprocket means (not shown) such that all sprocket wheels 16 rotate at substantially the same speed. The sprockets 16 at each end of the upper chains 12 and 14 are commonly shafted as are the sprockets 16 at each end of the lower chains 13 and 15.

Figure 2:
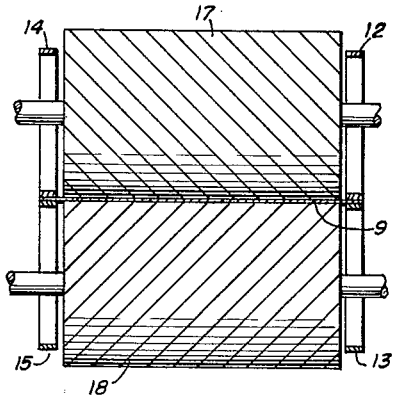
FIG. 2 is a cross section taken on line 2—2 of FIG. 1.
Figure 3:
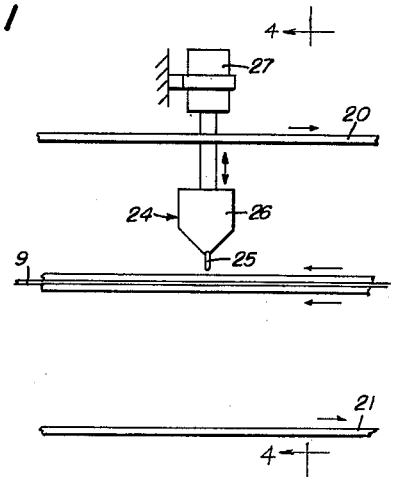
FIG. 3 is a side elevation of the cutter section of the novel machine.

The embossing zone 3 comprises a pair of embossing rolls including an upper embossing roll 17 and a lower embossing roll 18. The embossing rolls 17 and 18 are of the usual mating type. The embossing rolls are of a width less than the width of the sheet material 9 such that the embossing rolls freely rotate between the chain pairs 12 through 15 to contact and emboss the sheet material 9 as it is clamped by each chain pair as best shown in FIG. 2. The cooling zone 4 extends beyond the embossing zone 3 for a distance sufficient to provide desired cooling of the embossed sheet material 9 after it has left the embossing rolls 17 through 18. It will be noted that the sheet material 9 is supported and gripped by the chain pairs 12 through 15 throughout the heating, embossing and cooling operations, thereby, preventing contractions in the width of said sheet material during the heating and cooling cycle. The sheet material 9 preferably passes through the heating zone 2, the embossing zone 3 and the cooling zone 4 at a constant speed as determined by the drive means for the sprockets 16.

The cutter zone 6 and subsequent sheeting zone 7 involve intermittent sequential operations, as will be herein-after described, and any slack occurring in the sheet material 9 as it passes from the cooling zone 4 to the cutter zone 6 is taken up in the slack take-up zone 5. The slack take-up zone 5 can comprise a dancer roll 19 around which the sheet material passes. The dancer roll 19 is biased either by gravity or other suitable force, e.g. spring means, to take-up any slack in said sheet material.

Following the slack take-up zone 5 is a second conveying means comprising a pair of vertically disposed, sprocket driven, continuous chains 20—21 and 22—23 along each edge of the sheet material 9. The continuous chains 20 through 23 are disposed and driven in a similar manner as the conveying means previously described for the heating, embossing and cooling zones, respectively 2, 3 and 4, to tightly grip the sheet material 9 along its edges as it passes through the cutter zone 6 and sheeting zone 7.

Figure 4:
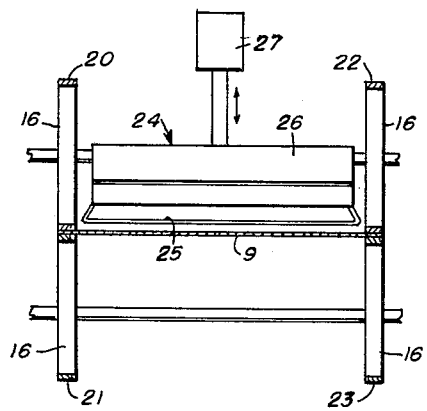
FIG. 4 is a cross section taken on line 4—4 of FIG. 3.
Figure 5:
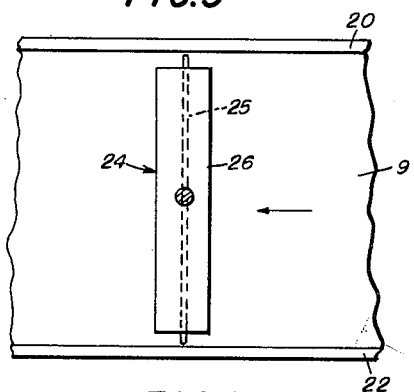
FIG. 5 is a top view of the cutter section of the novel machine.

The sheet material 9 then passes to the cutter zone 6 which comprises a hot-wire cutting assembly 24 which, in turn, comprises a hot wire 25 and energizing means 26 for said hot wire. The hot wire 25 can be a resistance wire which is supplied with electric power by the energizing means 26. The hot wire 25 extends transversely across the sheet 9, as best shown in FIGS. 4 and 5 for substantially the width of said sheet material between the chain pairs 20 through 23. The hot wire cutting assembly 24 is connected to a suitable vertical moving device, for example an air cylinder 27, for movement to contact the hot wire 25 with the sheet material 9 and subsequently retraction of said hot-wire from said sheet material. When the hot wire 25 contacts the sheet 9 it causes said sheet to melt and rupture along line of contact. Thus, the sheet material 9 is cut to form a narrow slot S from a point adjacent chain pair 20—21 transversely across the width of said sheet material to a point adjacent the chain pair 22—23 and leaving a margin of continuous unsevered sheet material 9 along each edge thereof.

Figure 6:
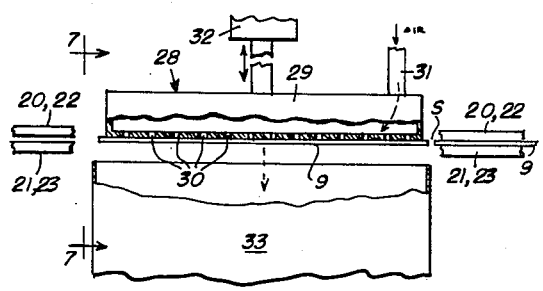
FIG. 6 is a side elevation of the sheeter section of the novel machine.
Figure 7:
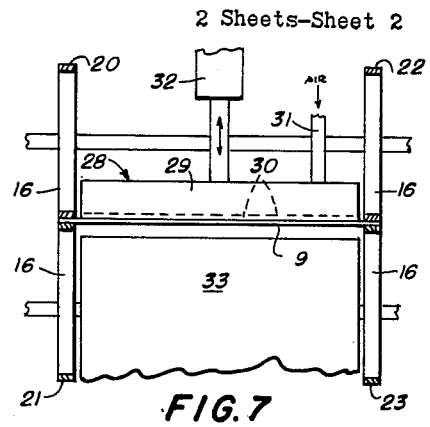
FIG. 7 is a section on line 7—7 of FIG. 6.

The chain pairs 20 through 23 then convey the sheet material 9 to the sheeting zone 7 wherein sheets of predetermined length are severed from said sheet material, as best shown in FIGS. 6 and 7. The sheeting zone 7 contains a planar punch 28 having a width of substantially the distance between the chain pairs 20—21 and 22—23, as best shown in FIG. 7 and a predetermined length equal to the length of the desired sheet. The planar punch 28 comprises an air plenum 29, a lower perforated surface 30 and an air inlet 31 connected to said plenum. The planar punch 28 is connected to means such as an air cylinder 32 for moving said punch vertically. When moved in a downward direction, the punch 28 engages the sheet 9 forcing it downwardly to sever a sheet of predetermined dimensions from said continuous sheet material 9. Air is introduced into the plenum 29 and exits from said plenum through the perforations of the lower perforated surface 30 to prevent retention of the punched sheet to the planar punch 28. A receptacle 33 of substantially the same or larger dimensions as the punched sheet is disposed below the planar punch 28 for receiving said punched sheet.

The cutting assembly 24 is spaced from the planar punch 28 at a predetermined distance which is substantially equal to the longitudinal dimension of said punch. The slots S formed by the cutting assembly 24 thus will lie under the transverse edges of the punch 28. As the punch moves downwardly and contacts the sheet 9, those portions of said sheet 9 lying under the longitudinal edges of said punch are sheared against the upper surfaces of the lower chains 21 and 23 to thus sever a sheet of predetermined size substantially the same as the lower perforated surface of punch 28.

The drive mechanism for the sprockets 16 of chains 20 through 23 is timed for intermittent sequential operation such that the said chains are idle when the cutting assembly 24 and the punch 28 are actuated in a downward movement by air cylinders 27 and 32, respectively. Any suitable timing and control mechanism as will be apparent to those skilled in the art can be employed for stopping the chains 20 through 23 while actuating the cutting assembly 24 and punch 28 and is retracting said cutting assembly and punch while reactuating the chains 20 through 23.

The winding zone 8 comprises a wind roll 34 adapted to receiving embossed sheet material when it is desired to convert the sheet material 9 to a continuous embossed sheet material. In this instance, the cutting assembly 24 and planar punch 28 are immobilized and the sheet material 9 is threaded directly from the cooling zone 4 to chains 20 to 23 and thence to the winding roll 34. In this regard, the traversal along chains 20 through 23 can be considered as an extension of the cooling zone 4 thereby providing complete cooling of the embossed sheet material prior to winding it on the roll 34. The winding roll 34 can be of any of the well known types including the flying splicer types of winding rolls.

Figure 8:
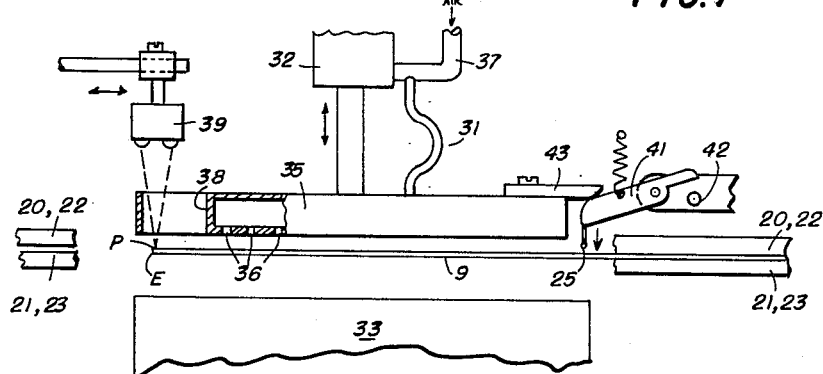

Another embodiment of cutting and sheeting apparatus is shown in FIG. 8, wherein the hot wire 25 is pivotally mounted adjacent the sheeting apparatus for actuation by said sheeting apparatus. The sheeting apparatus comprises a platen 35, connected to the piston of an air cylinder 32 for vertical movement, and having small air ducts 36 internally provided therein and opening onto the lower surface of said platen. The air ducts 36 are commonly connected to the air supply line 37 to the lower half of cylinder 32 such that air is supplied thereto when the platen 35 is in its lowermost position and beginning to move upwardly.

A slot 38 is formed through one end of the platen and a photoelectric cell 39 is movably mounted on a support rod 40 above the slot 37 and focused at a point below said slot lying on the same plane as sheet material 9. The photoelectric cell 39 is connected into a control circuit for stopping the chains 20—23 and supplying air to the upper end of cylinder 32 when the forward transverse edge E of sheet material 9 reaches the focal point P of said photoelectric cell. The photoelectric cell 39 is adjustable along rod 40 to regulate the length of sheet to be cut from sheet material 9, as desired.

The hot wire 25 is mounted on a pivot bar 41 which is spring-biased to pivot upwardly. The pivot bar 41 is limited in its upward pivoting by set screw 42. A trip arm 43 is mounted on the upper surface of platen 35 to extend out over the pivot bar 41. The hot wire 25 is mounted by the pivot bar 41 such that its length is disposed below the lower surface of the platen 35 and reaches the sheet material 9 before said platen. A receptacle or basket 33 is positioned below the platen 35 to receive the severed sheets.

Figure 9:
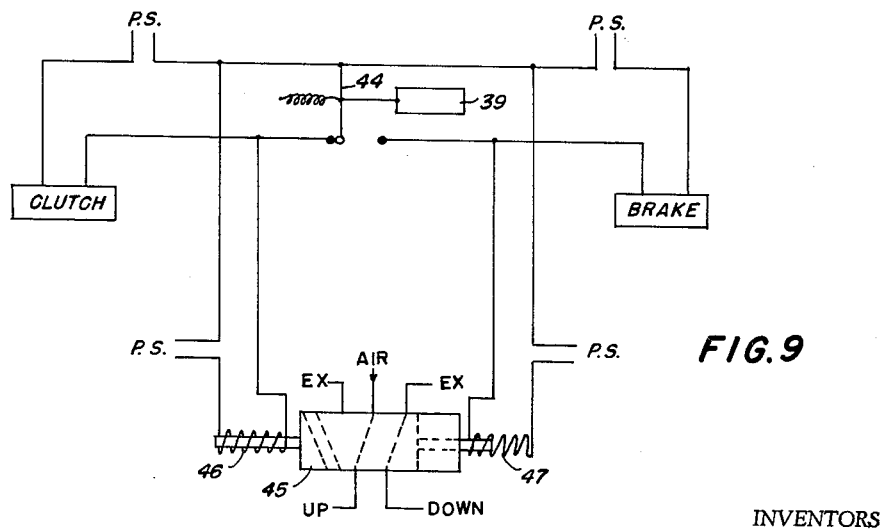

A control mechanism suitable for controlling the actuation of the cutting and sheeting apparatus, includes a magnetic clutch and magnetic brake interposed in the drive mechanism for the sprockets 16, which drive chains 20—23, between the drive source and said sprockets. As best shown in FIG. 9, the magnetic clutch and brake are controlled by a microswitch 44 spring-biased to close the magnetic clutch circuit.

The photoelectric cell 39 is operatively connected through suitable relays to the microswitch 44 to actuate said microswitch when the photoelectric cell senses the edge E of sheet material 9 at point P. When actuated, the microswitch 44 opens the clutch circuit to disconnect the sprockets 16 from the drive source and closes a circuit to the magnetic brake which then operates to stop said sprockets.

In order to control the up-down movement of platen 35 by air cylinder 32 a four-way valve 45 is provided for controlling the supply of air to the upper part of the cylinder or the lower part of the cylinder and to connect the opposite end of said cylinder to exhaust in the usual manner. An up solenoid 46 actuates said four-way valve and is electrically connected to the microswitch 44 on the same side as the magnetic clutch circuit such that when the magnetic clutch is actuated, the up solenoid 46 is also actuated to connect the lower part of the air cylinder 32 to air supply and the upper part thereof to exhaust. A down solenoid 47 similarly acts on four-way valve 45 in opposition and is electrically connected to the microswitch 44 on the brake side thereof. Thus, when the photoelectric cell 39 senses the edge E of sheet material 9 at point P, the microswitch 44 is actuated to connect the down solenoid 47 to electrical power thereby becoming energized to actuate the four-way valve 45 thereby connecting the upper portion of cylinder 32 to the air supply and the lower portion of said cylinder to exhaust. Thus, the platen 35 is moved downwardly into contact with the sheet material 9 to strip it from the chains 20—23 whereupon the photoelectric cell 39 is duly actuated and microswitch 44 returns to its spring-biased position closing the clutch circuit and the up solenoid to power.

What is claimed is:

1. Apparatus for embossing and sheeting continuous lengths of expanded thermoplastic sheet material comprising a heating zone, first moving means gripping said sheet material along its longitudinal edges and moving same in a direction parallel to said edges through said heating zone and for a distance beyond said heating zone; and a pair of mating embossing rolls, one on each side of said sheet material and bearing on said sheet material to impress a pattern thereon, said embossing rolls being of a predetermined width less than the width of said sheet material and less than the distance between said first moving means gripping each side edge of said sheet material, said embossing means being disposed adjacent said heating zone and said first moving means extending for a distance beyond said embossing rolls to define a cooling zone for said sheet material; a second moving means aligned with said first moving means but spaced therefrom for gripping the side edges of and moving said sheet material delivered by said first moving means; slack take-up means between said first and second moving means for operating on said sheet material to take up slack occurring therein; platen means disposed in a plane substantially parallel with the plane of said sheet material and moveable into pressure contact with said sheet material; cutting means intermediate said slack take-up means and said platen means for forming a transverse cut in said sheet material while gripped by said second moving means, said cut terminating short of the side edges of said sheet material and being of a length equal to less than the distance between the side edge gripping areas of said second moving means; said platen means having an edge adjacent to said cutting means and parallel to said cut formed by said cutting means and a pair of longitudinal edges parallel with said second moving means; a means for substantially aligning the transverse cut formed in said sheet material with the edge of said platen means; an actuating means adapted to directionally move the platen means to contact said edge with the sheet material substantially adjacent to said cut, said longitudinal edges adapted to shear against the second moving means, thereby severing a sheet of substantially the same size as the platen means; and means on the opposite side of said sheet material from said platen means for receiving sheets stripped from said continuous length of sheet material.

2. Apparatus as claimed in claim 1 wherein said cutting means is a hot wire.

3. Apparatus as claimed in claim 1 wherein the moving means comprises two pairs of interengaging chains, each pair being disposed along a side edge of said sheet material and gripping said sheet material therebetween, and said platen means is of a width less than the distance between said pairs of chains whereby said sheet material is sheared by said platen means against said chain pairs.

4. Apparatus as claimed in claim 1 wherein said platen means is provided with compressed air means for ejecting compressed air against said sheet material as it is stripped from said continuous length.

5. Apparatus as claimed in claim 1 wherein there is provided sensing means for sensing a predetermined length of sheet material to be stripped and de-activating said moving means while activating said cutting means and platen means.

6. Apparatus for stripping sheets of pre-determined length from a continuous length expanded thermoplastic sheet material comprising moving means gripping the side edges of said continuous length and moving said continuous length in a direction parallel to said edges for a predetermined planar distance; cutting means for forming a transverse cut in said sheet material as it is being moved and gripped by said moving means, said cut terminating short of the side edges of said sheet material and being of a length less than the distance between the moving means gripping the side edges of said sheet material; a platen having a surface in a plane parallel to said sheet material and movable into contact with said sheet material, said surface having an edge closest to said cutting means and said edge being parallel to said cut formed by said cutting means, said surface having a pair of longitudinal edges parallel to the moving means gripping the side edges; a means for substantially aligning the transverse cut formed in said sheet material with the edge of said surface; an actuating means for moving the surface in a downward direction into overlying pressure contact with said sheet material to position said edge closest said cutting means substantially adjacent said cut, said longitudinal edges adapted to shear against the moving means, thereby severing a sheet of substantially the same size as the surface of the platen.

7. Apparatus as claimed in claim 6 wherein said platen is provided with compressed air means for directing air pressure against said sheet material overlaid by said pressure contacting surface of said platen.

8. Apparatus as claimed in claim 6 wherein there is provided receptacle means on the opposite side of said sheet material from said platen for receiving sheets cut therefrom.

9. Apparatus as claimed in claim 6 wherein there is provided sensing means for de-activating said moving and gripping means and activating said platen means and cutting means.

10. Apparatus as claimed in claim 6 wherein said moving means comprises two pairs of interengaging chains, one pair along each side edge of said continuous length and gripping said side edges whereby said platen means shears said continuous length against said chains.

References Cited in the file of this patent

UNITED STATES PATENTS

| | | |
|---|---|---|
| 2,219,158 | Benschoten | Oct. 22, 1940 |
| 2,262,493 | Guinzburg | Nov. 11, 1941 |
| 2,529,083 | Keefe | Nov. 7, 1950 |
| 2,582,449 | Millar et al. | Jan. 15, 1952 |
| 2,618,012 | Milne | Nov. 18, 1952 |
| 2,877,498 | Schneider | Mar. 17, 1959 |
| 2,960,722 | Freeman | Nov. 22, 1960 |
| 2,967,328 | Shelby et al. | Jan. 10, 1961 |
| 3,026,566 | Martelli et al. | Mar. 27, 1962 |

FOREIGN PATENTS

| | | |
|---|---|---|
| 604,133 | Canada | Aug. 30, 1960 |